F. Müller.
Tassel Clip.
No. 85,953.                    Patented Jan. 12, 1869.
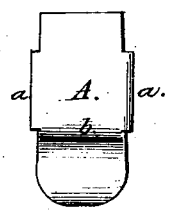
Fig. 1.
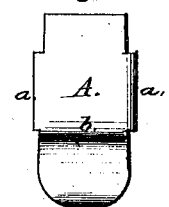
Fig. 5.
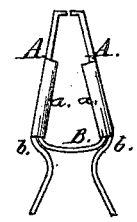
Fig. 2.
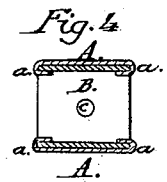
Fig. 4.
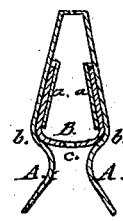
Witnesses:
Inventor:
Frederick Muller

FREDERICK MÜLLER, OF BOSTON, MASSACHUSETTS.

Letters Patent No. 85,953, dated January 19, 1869.

IMPROVED WINDOW-SHADE-TASSEL CLIP.

The Schedule referred to in these Letters Patent and making part of the same.

*To all persons to whom these presents may come:*

Be it known that I, FREDERICK MÜLLER, of Boston, in the county of Suffolk, and State of Massachusetts, have invented an Improved Window-Shade-Tassel Clasp; and I do hereby declare the same to be fully described in the following specification, and represented in the accompanying drawings, of which—

Figures 1 and 2 are side views, and

Figure 3, a vertical section of the clasp.

Figure 4 is a horizontal section of it.

Figure 5 is a view of it as connected with a tassel by its line or cord.

My invention consists in an improved construction of clasps for attaching cords and tassels to window-curtains, whereby I avoid the use of either rivets or solder in their manufacture, and which, when made, can be securely attached without the use of screws or nuts of any kind.

To construct my improved device, I first provide a flat metal spring, B, bent in the form of a letter U, with its ends slightly drawn inward, as shown in fig. 3.

I then provide two rectangular pieces or strips of sheet-metal, each piece having a lip, $a$, projecting from each edge for nearly one-third of its length, as represented in figs. 1 and 5.

The upper ends of these strips are bent at a right angle, so as to form inwardly-projecting lips or hooks, $e$, as shown in figs. 2 and 3.

The side lips $a$ are then bent inward so as to embrace the edges of the spring B, as shown in figs. 3 and 4, the strips being bent inward at the point marked $b$ on the figures, so as to engage slightly under the shoulders of the spring B, and thus prevent the parts from becoming detached.

A hole, $c$, is made in the centre of the spring B for receiving and holding the cord to which the tassel is secured, as shown in fig. 5, the hole $c$ being shown in fig. 3.

The bars or strips A are extended down beyond the point where they impinge upon the spring, far enough to form levers, by pressing on which, with the thumb and finger, the upper ends will be forced asunder, and the clasp thus released from the bar of the curtain over which the lips or the hooks $e$ engage, to hold it firmly in place.

By this method, I am enabled to construct a clasp without solder or rivets, and that avoids the use of any nut or screw for attaching it, and which, by means of the lips hooking over the bar of the curtain, cannot be easily or accidentally pulled off, and yet can be instantly detached, when it is desired to do so.

Another advantage of my device is, that it does not indent or disfigure the curtain and bar, as do those which are secured by simply clasping or pressing against the sides of the bar, and which are tightened by a screw or thumb-nut. My device is, therefore, cheaper, more efficient, quicker and easier applied and detached, besides being less likely to mar or injure the curtain, than any device heretofore constructed for the purpose.

I am aware that a clasp for the same purpose has heretofore been made, and therefore I do not claim broadly the use of such a device; but having thus fully described my invention,

What I claim, is—

The clasp, consisting of the spring B, and the side pieces A united thereto by means of the lips $a$, and having the hooks $e$ on their upper ends, all substantially as shown and described.

FREDERICK MÜLLER.

Witnesses:
R. H. EDDY,
F. P. HALE, Jr.